United States Patent [19]

Devaux et al.

[11] Patent Number: 4,552,929

[45] Date of Patent: Nov. 12, 1985

[54] SULPHUR-CONTAINING POLYMERS USEFUL AS STABILIZING AGENTS FOR RUBBER VULCANIZATES

[75] Inventors: Albert F. L. G. Devaux, Mont Saint Guibert; Philippe G. Moniotte, Heron, both of Belgium

[73] Assignee: Monsanto Europe, S.A., Brussels, Belgium

[21] Appl. No.: 617,064

[22] Filed: Jun. 4, 1984

[30] Foreign Application Priority Data

Jun. 10, 1983 [GB] United Kingdom ................. 8315977

[51] Int. Cl.⁴ ............................................. C08C 19/20
[52] U.S. Cl. .................................. 525/332.6; 525/236; 525/343; 528/390
[58] Field of Search ...................................... 525/332.6

[56] References Cited

U.S. PATENT DOCUMENTS 3,197,446  7/1965  Ziarnik ................................ 525/343

3,607,844  9/1971  Taylor ................................. 525/343

OTHER PUBLICATIONS

CA 63:11338a "Preparation and Properties of Certain Polymeric and Cyclic Trithiocarboxylates".
CA 87:23970b "Poly(Trithiocarbonates)".

Primary Examiner—Christopher A. Henderson
Attorney, Agent, or Firm—Gordon B. Seward

[57] ABSTRACT

Additives for rubber compositions, giving vulcanizates having improved retention of optimum physical properties, are polymeric trithiocarbonates having a structure comprising repeating units of the formula

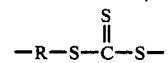

where R is an organic bridging group, e.g. an alkylene group.

7 Claims, No Drawings

SULPHUR-CONTAINING POLYMERS USEFUL AS STABILIZING AGENTS FOR RUBBER VULCANIZATES

BACKGROUND OF THE INVENTION

This invention relates to rubber vulcanisates having improved physical properties.

The process of vulcanising diene rubbers by heating with sulphur and a vulcanisation accelerator has been known for many years. By this process, vulcanisates having certain physical properties, for instance tensile strength, resilience and fatigue resistance at a high level can be obtained, but such vulcanisates tend not to have good ageing properties. Apart from the addition of antioxidants which will retard oxidative heat ageing, other methods which have been proposed for making vulcanisates having improved ageing properties include the use of lower proportions of sulphur and increased proportions of accelerator relative to those which would be employed for a conventional cure, and the partial or complete replacement of sulphur by other cross-linking agents.

Vulcanisates made using such alternative systems tend, however, to lack certain of the merits of a sulphur-cured vulcanisate, and there is therefore a need for additives which will improve the ageing properties of vulcanisate while retaining the merits of using sulphur as the vulcanising agent.

SUMMARY OF THE INVENTION

According to the present invention we have found that vulcanisates having improved properties can be obtained by adding polymeric trithiocarbonates in addition to sulphur and a vulcanisation accelerator during the compounding of diene rubbers. These materials have the effect of stabilizing the properties of the vulcanisate if the temperature of the vulcanisate unavoidably remains high for a prolonged period after cure, and during the service life of the vulcanisate.

The invention provides a vulcanisable rubber composition comprising a diene rubber, sulphur and a vulcanisation accelerator, characterised in that the composition also contains a polymeric trithiocarbonate having a structure comprising repeating units of the formula

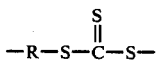
(I)

where R is an organic bridging group.

A preferred class of polymeric trithiocarbonates useful in the present invention can be represented by the formula

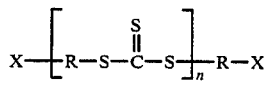
(II)

where R is an organic bridging group, X represents a halogen atom or a group that has replaced the halogen atom, and n is the number of units in the polymer molecule.

The invention also includes a vulcanisate that has been obtained by heating a vulcanisable rubber composition of the invention at a vulcanisation temperature.

In the above formulae, R can be, for example, a straight- or branched-chain alkylene or alkenylene group, preferably one containing from 4 to 20 carbon atoms, and more preferably one containing 5 to 16 carbon atoms. Examples of such groups are tetramethylene, pentamethylene, hexamethylene, octamethylene, nonamethylene, decamethylene, dodecamethylene, 3-methyl-1,5-pentylene and 1,6-hex-2-enylene. As a variant, a divalent bridging group may be an alkylene or alkenylene group having one or more aryl, for example phenyl, substituents. An example of such a radical is 2-phenyl-1,4-butylene.

In other instances, R has a structure comprising two or more alkylene units, pairs of such units being linked through an oxygen or sulphur atom, through a sequence of two or more sulphur atoms, through a group —COO—, or through an arylene or cycloalkylene radical. Representative of such structures ar those of the formulae

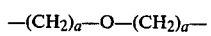

and

where each a' and each c independently represents an integer of from 1 to 20, a represents an integer of from 2 to 20, each b independently represents an integer of from 1 to 10, A represents phenylene or cyclohexylene, and Y represents a group —$(CH_2)_c$— or a group —$(CH_2CH_2O)_dCH_2CH_2$— where d represents an integer of from 1 to 5. Preferred values for a are from 2 to 8, preferred values for a' are from 1 to 6, preferred values for b are 1 to 4, and preferred values for c are from 1 to 18, more especially 1 to 12.

Where values of a, a', b, or c exceed 2, the polymethylene groups can be straight chain or branched, but preferably the terminal carbon atom of R which is attached to —S— in formula (I) above is a primary carbon atom.

When X in formula (II) represents a halogen atom, this is usually chlorine or bromine. Possible values of X when X represents a group which has replaced the halogen atom are hydroxy, alkoxy, mercapto, alkylthio, ammonium, alkylammonium and quaternary ammonium.

The polymeric trithiocarbonates of formula (II) above are new materials.

DESCRIPTION OF THE PREFERRED EMBODIMENTS

A general method for the preparation of trithiocarbonates of formula (II) where X represents a halogen atom comprises the reaction of a dihalo compound of the formula X—R—X where R and X are as defined in formula (I), with an alkali metal trithiocarbonate in the presence of a phase transfer catalyst, the alkali metal trithiocarbonate being present in aqueous solution and the dihalo compound forming or being present in a water-immiscible organic phase.

Reaction temperatures of from 30° to 100° C. may be used, preferred temperatures being those in the range 40° to 60° C.

In some instances, the product is an insoluble solid which can be recovered by filtration of the final reaction mixture. In other instances, the polymer is of lower molecular weight, n having an average value of, for example, from 1.5 to 4, and forms a liquid organic phase. It is also possible to employ a low molecular weight polymer as the starting material of formula X—R—X in the above process. Reaction with alkali metal trithiocarbonate gives a polymer of higher molecular weight, with n having an average value of, for example up to 25. Thus by suitable selection of the proportions of reactants, reaction conditions and the use, if necessary, of a multi-stage process, it is possible to obtain polymers having any desired degree of polymerisation. Purification and isolation of the polymeric trithiocarbonates can be effected by conventional techniques.

Quarternary ammonium salts, for example tetrabutylammonium chloride, are suitable phase transfer catalysts.

Polymers wherein X represents a group other than halogen can be prepared by reacting a polymer where X is halogen with a halogen-displacing reagent; for example an alkali metal alkoxide or an alkali metal mercaptan to give respectively alkoxy- or alkylthio-terminated trithiocarbonate polymers.

Polymeric trithiocarbonates useful in the present invention can also be prepared by the method described by Braun and Kiessel, Monatsh. Chem. 96(2) 631–41 (1965), and by the method described in DE-A-2 558 370.

The stabiliser materials referred to above are especially effective in compositions in which the rubber is cis-polyisoprene, either natural or synthetic, and in blends containing at least 25% by weight of cis-polyisoprene with other rubbers. Preferably the rubber, if a blend, contains at least 40% and more preferably at least 60% by weight of cis-polyisoprene. Examples of other rubbers which may be blended with cis-polyisoprene include poly-1,3-butadiene, copolymers of 1,3-butadiene with other monomers, for example styrene, acrylonitrile, isobutylene, and methyl methacrylate, and ethylene-propylene-diene terpolymers.

The amount of stabiliser compound employed in the compositions of the present invention is usually from 0.5 to 5, for example from 1.5 to 5, parts by weight, and preferably from 2 to 4 parts by weight per 100 parts by weight of rubber.

In the composition of the invention the essential vulcanising agent is sulphur, but other vulcanising agents such as amine disulphides need not be excluded. The amount of sulphur in the compositions is typically from 2 to 3 parts by weight per 100 parts by weight of rubber, but lesser or larger amounts, for example from 1 to 5 parts on the same basis, may be employed.

In the composition of the invention, a single accelerator or a mixture of accelerators can be employed. These include thiazole-based accelerators, for example 2-mercaptobenzothiazole, bis(2-benzothiazolyl)disulphide, benzothiazole-2-sulphenamides for instance N-isopropyl-benzothiazole-2-sulphenamide, N-tert-butyl-benzothiazole-2-sulphenamide, N-cyclohexylbenzothiazole-2-sulphenamide, N,N-diisopropyl-benzothiazole-2-sulphenamide, N,N-dicyclohexyl-benzothiazole-2-sulphenamide and 2(morpholinothio)benzothiazole, thiocarbamylsulphenamides, for example N,N-dimethyl-N',N'-dicyclohexylthiocarbamylsulphenamide and N(morpholinothiocarbonylthio)morpholine. Mixtures of thiazole-based accelerators with diphenyl-guanidine can be used. Preferred accelerators are the benzothiazole-2-sulphenamides. In the compositions of the invention, these are usually used in amounts of from 0.5 to 1.5 part by weight per 100 parts by weight of rubber.

The vulcanisate stabilisers used in this invention can be incorporated into rubber by conventional mixing procedures, for example by adding them in a Banbury mixer or by adding them to the rubber on a mill. Ordinarily, with liquid or low melting solid vulcanisate stabilisers, no special precautions are necessary for obtaining good dispersions. However, when using higher melting vulcanisate stabilisers it is recommended that they be ground to a fine powder, preferably 70 micrometer particle size or less, to ensure adequate dispersion. Such powders may be treated to suppress dust, for example by the addition of oil, or they can be mixed with a binder, for example a polymer latex, and formed into granules or pellets containing up to 5% weight of binder. They can also be formulated as predispersions in certain rubbery polymers, such as EPDM or ethylene-vinyl acetate rubber, which predispersions may contain, for example, from 15 to 50% by weight of polymer.

The rubber stocks may include reinforcing carbon blacks, pigments such as titanium dioxide and silicon dioxide, metal oxide activators such as zinc oxide and magnesium oxide, stearic acid, hydrocarbon softeners and extender oils, amine, ether, and phenolic antioxidants, phenylenediamine antidegradants, and tackifiers. The stocks may also contain prevulcanization inhibitors but in many stocks their use is unnecessary.

The invention is illustrated by the following Examples:

EXAMPLES 1–7

General method for the preparation of oligomeric trithiocarbonates. An aqueous solution of sodium trithiocarbonate (50 ml, of concentration 1.4 M/l) and an aqueous solution of tetrabutylammonium chloride (30 ml, prepared from 4 ml of 40% $NBu_4OH$ solution neutralised with hydrochloric acid) were well stirred in a flask fitted with a reflux condenser, to which a dichloro compound (0.07 mole) was added. This mixture was stirred at 50° C. for 9 hours, and the yellow oil was extracted into chloroform, washed with water and dried. Removal of the solvent in vacuo yielded the trithiocarbonate having the general structure —(-R—S—CS—S)$_n$—R—.

EXAMPLE 1

The dichloro compound was 4,4'dichlorodibutyl ether. The yield was 91%, and the NMR spectra indicated the above structure in which R=—$(CH_2)_4$—O—$(CH_2)_4$— and $\bar{n}=2$.

EXAMPLE 2

The dichloro compound was $Cl(CH_2)_3$—CO—O$(CH_2)_4$Cl. The yield was 97%, and the NMR spectrum of the product was consistent with the above structure, with R=—$(CH_2)_3$—CO—O$(CH_2)_4$— and $\bar{n}=1.5$.

EXAMPLE 3

The dichloro compound was ethylene glycol bis(2-chloroethyl)ether. The yield was 93%, and the NMR spectrum was consistent with the above general structure, with R=—$(CH_2)_2$—O—$(CH_2)_2$—O—$(CH_2)_2$— and $\bar{n}=2.8$.

EXAMPLE 4

The dichloro compound was 2.2'dichlorodiethyl ether. The yield was 73%, and the NMR spectrum of the product was consistent with the above structure, with R=—(CH$_2$)$_2$—O—(CH$_2$)$_2$— and $\bar{n}$=2.5.

EXAMPLE 5

The dichloro compound was 4.4'-dichlorodibutyl formal. The yield was 96%, and the NMR spectrum of the product was consistent with the above structure, with R=—(CH$_2$)$_4$—O—CH$_2$—O(CH$_2$)$_4$— and $\bar{n}$=2.

EXAMPLE 6

The dichloro compound was 1,4-bis(chloromethyl)-cyclohexane. The yield was 90%, and the NMR spectrum of the product was consistent with the above structure, with R=—CH$_2$—C$_6$H$_{10}$—CH$_2$— and $\bar{n}$=2.2.

EXAMPLE 7

The dichloro compound was an oligomeric trithiocarbonate obtained from 4,4'-dichlorodibutyl ether with $\bar{n}$ about 3. The product was a polymer having —(CH$_2$)$_4$—O—(CH$_2$)$_4$— as the group R in the above structure, and $\bar{n}$=20.

EXAMPLE 8

This Example describes the preparation of a polymeric trithiocarbonate using a dibromo compound as starting material.

50 ml of a 1.4M aqueous solution of sodium trithiocarbonate and 30 ml of an aqueous solution of tetrabutyl ammonium chloride (prepared as described under Examples 1–7) were stirred in a flask fitted with a reflux condenser. 0.07 Mole of 1,4-dibromobutane was added, and the mixture was stirred at 50° C. for 9 hours. The aqueous phase was then separated and chloroform was added to the organic phase. The chloroform solution was filtered to recover a yellow solid (8A). Evaporation of the filtrate gave a yellow paste (8B).

To evaluate the use of the polymeric trithiocarbonates according to this invention in natural rubber vulcanisates, a masterbatch having the following composition was prepared:

|  | Parts by Weight |
| --- | --- |
| Natural rubber | 100 |
| Carbon Black | 50 |
| Zinc Oxide | 5 |
| Stearic Acid | 2 |
| Processing Oil | 3 |
| N—phenyl-N'—(1,3-dimethylbutyl)-p-phenylenediamine (Antidegradant) | 2 |

Portions of the masterbatch were taken and mixed with sulphur, 2(morpholinothio)benzothiazole and the stabiliser compound in the proportion 2.5, 0.7 and 3.0 parts by weight respectively per 100 parts by weight of rubber. A further portion of masterbatch to which only sulphur and 2(morpholinothio)benzothiazole were added was used as a control.

The curing characteristics of the vulcanisable compositions thus obtained were determined at the curing temperatures shown in the Table below by means of the Monsanto Oscillating Disc Rheometer, ISO 3417-1977(E). From the Rheometer data, the time (t max.) required to reach maximum torque (maximum modulus) was recorded. Vulcanisates were prepared by press curing at 141° C. for the time (t max.) indicated by the Rheometer data to give maximum modulus. Other vulcanisates were prepared at the same temperature but were held at this temperature for 200 minutes (overcure). Both types of vulcanisate were subjected to conventional methods of physical testing. Resilience measurements were carried out according to British Standard 903 part A8 (1963).

In the table below, the stabiliser compounds are identified by numbers according to the preceding Examples. Figures shown in parenthesis are those obtained for the corresponding controls.

| Polymer (Example No.) | 300% Modulus (MPa)[1] | % Retention of 300% Modulus on over-cure[2] | Resilience (1) | % Retention of Resilience on over-cure (2) |
| --- | --- | --- | --- | --- |
| 1 | 16.1 (16.4) | 98 (82) | 68.9 (70.7) | 90 (87) |
| 3 | 17.5 (16.0) | 94 (93) | 67.6 (68.9) | 91 (85) |
| 4 | 17.8 (16.0) | 107 (93) | 64.9 (68.9) | 96 (85) |
| 5 | 15.4 (16.0) | 99 (93) | 68.3 (68.9) | 90 (85) |
| 7 | 18.7 (16.4) | 93 (82) | 65.3 (70.7) | 90 (87) |
| 8A | 17.5 (16.4) | 104 (82) | 66.0 (70.7) | 94 (87) |
| 8B | 17.5 (16.4) | 100 (82) | 61.8 (70.7) | 95 (87) |

[1]Sample cured to t max.
[2]Result for sample cured for 200 minutes expressed as a percentage of the result for sample cured to t max.

These results show the value of the stabiliser compounds in alleviating the adverse effects of overcure.

We claim:

1. A vulcanisable rubber composition comprising a diene rubber, sulphur and a vulcanisation accelerator, characterised in that the composition also contains a polymeric trithiocarbonate having a structure comprising repeating units of the formula

(I)

where R is a straight- or branched-chain alkylene group containing 5 to 16 carbon atoms.

2. A vulcanisable rubber composition comprising a diene rubber, sulphur and a vulcanisation accelerator characterised in that the composition also contains a polymeric trithiocarbonate having a structure comprising repeating units of the formula

(I)

where R is an organic bridging group wherein the polymeric trithiocarbonate has the formula

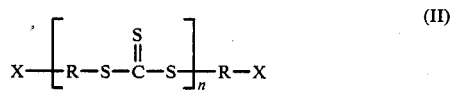

(II)

where X represents a halogen atom or a group that has replaced the halogen atom, a nd n is the number of units in the polymer molecule wherein R is a group having the formula

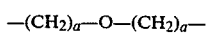

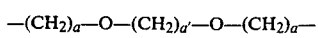

$-(CH_2)_b-A-(CH_2)_b-$ $-(CH_2)_c-COO-(CH_2)_a-$ $-(CH_2)_c-COO-Y-OOC-(CH_2)_c-$ where each a independently represents an integer from 2 to 8, a' represents an integer from 1 to 6, each b independently represents an integer from 1 to 4, each c independently represents an integer from 1 to 12, A represents phenylene or cyclohexylene, and Y represents a group $-(CH_2)_c-$ or a group $-(CH_2CH_2O)_d CH_2CH_2-$ where d represents an integer of from 1 to 5.

3. A composition according to claim 2 wherein X represents chlorine or bromine.

4. A composition according to claim 2 wherein n has an average value of from 1.5 to 4.

5. A composition according to claim 1 wherein the amount of the polymeric trithiocarbonate is from 1 to 5 parts by weight per 100 parts by weight of rubber.

6. A composition according to claim 1 wherein the diene rubber is cis-polyisoprene or a blend containing at least 25% by weight of cis-polyisoprene.

7. A vulcanisate that has been obtained by heating a composition according to claim 1 at a vulcanisation temperature.

* * * * *